United States Patent
Vestberg et al.

(10) Patent No.: US 7,465,775 B2
(45) Date of Patent: Dec. 16, 2008

(54) PROCESS FOR THE PRODUCTION OF POLYPROPYLENE USING HIGH YIELD ZIEGLER-NATTA CATALYSTS

(75) Inventors: Torvald Vestberg, Porvoo (FI); Pirjo Jääskeläinen, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/559,484

(22) PCT Filed: Jun. 4, 2004

(86) PCT No.: PCT/EP2004/006053

§ 371 (c)(1),
(2), (4) Date: May 2, 2006

(87) PCT Pub. No.: WO2004/111098

PCT Pub. Date: Dec. 23, 2004

(65) Prior Publication Data

US 2006/0235172 A1      Oct. 19, 2006

(30) Foreign Application Priority Data

Jun. 6, 2003    (EP)    ................... 03012906

(51) Int. Cl.
C08F 210/06    (2006.01)
C08F 4/64    (2006.01)
(52) U.S. Cl. ................. 526/348; 526/123.1; 526/124.2; 526/124.3; 502/104; 502/115
(58) Field of Classification Search ............... 526/123.1, 526/124.2, 124.3; 502/104, 115
See application file for complete search history.

(56) References Cited

U.S. PATENT DOCUMENTS

| 4,181,762 A | 1/1980 | Benedyk |
| 4,668,753 A * | 5/1987 | Kashiwa et al. ............. 526/348 |
| 6,323,298 B1 | 11/2001 | Yanagihara et al. |

FOREIGN PATENT DOCUMENTS

| DE | 42 02 663 | 8/1993 |
| EP | 0 723 978 | 12/1998 |
| EP | 0 945 472 | 9/1999 |
| WO | WO 03 000754 | 1/2003 |
| WO | WO 03 000755 | 1/2003 |
| WO | WO 03 000757 | 1/2003 |

* cited by examiner

*Primary Examiner*—Caixia Lu
(74) *Attorney, Agent, or Firm*—Fay Sharpe LLP

(57) ABSTRACT

This invention relates to a process for the production of a polymer film or fibre wherein a polymer composition comprising a propylene homo- or copolymer is formed into a film or fibre, and wherein said propylene homo or copolymer is produced in a process which comprises the polymerization of propylene monomers or propylene monomers and one or more types of comonomers in the presence of a high yield Ziegler-Natta olefin polymerization catalyst, which catalyst comprises a component in the form of particles having a predetermined size range which has been produced in a process comprising: a) preparing a solution of a complex of a Group 2 metal and an electron donor by reacting a compound of said material with said electron donor or a precursor thereof in an organic liquid reaction medium, b) reacting said complex in solution with a compound of a transition metal to procedure an emulsion the dispersed phase of which containing more than 50 mol % of the Group 2 metal in said complex, c) maintaining the particles of said dispersed phase within the average size range of 5 to 200 microns by agitation in the presence of an emulsion stabilizer and d) solidifying said particles, and recovering, optionally washing said particles to obtain said catalyst component. The invention further relates to polpropylene products obtainable by this process and to the use of polypropylene products in the production of films and fibres.

5 Claims, 3 Drawing Sheets

PROCESS FOR THE PRODUCTION OF POLYPROPYLENE USING HIGH YIELD ZIEGLER-NATTA CATALYSTS

The present invention relates to a process for the production of propylene homo- and copolymers suitable for the production of films and fibres, which process comprises the polymerization of the monomers in the presence of a high yield Ziegler-Natta catalyst. The invention further relates to polypropylene products obtainable by this process and to the use of the polypropylene products in the production of films and fibres.

The production of propylene homo- and copolymers by the use of e.g. Ziegler-Natta catalysts is well-known in the art. In the production of these polymers, of course, it is desirable that the catalyst used in the production process provides the polymer in a high yield.

Conventional supported high yield Ziegler-Natta catalysts when used in the polymerization of propylene show a tendency to produce polypropylene with long isotactic sequences which leads to high crystallinity of the products and, in turn, to a high stiffness. For film and fibre applications, however, a lower stiffness of the polymer product is desirable. If conventional high yield catalysts are used, lower stiffness may be achieved by changing the type and amount of external donor in the polymerization process. However, products with lower stiffness produced according to such a process will have a lower crystallization degree and thus a higher amount of xylene solubles (XS), which is not desirable. Low xylene solubles (XS) is desired, because lower XS results in good transparency of the film products. In addition, low XS has a desired effect on coefficient friction. Further, if XS is high, odour and taste problems occur. According to the invention it is now possible to achieve low stiffness and still low XS, i.e. the disadvantages of higher XS can be avoided.

It has now surprisingly been found that propylene homo- and copolymers with excellent suitability for film and fibre application can be produced in a process comprising the use of a high yield Ziegler-Natta catalyst, which catalyst comprises a component which is prepared according to a method comprising:
a) forming a liquid/liquid emulsion system, which contains a homogenous solution of at least one catalyst component comprising a transition metal, i.e. a metal of groups 3 to 10 of the Periodic Table (IUPAC) or an actinide or lanthanide, said solution being dispersed in a solvent immiscible therewith and forming the dispersed phase of the liquid/liquid emulsion system,
b) solidifying said dispersed droplets to form solid catalyst component particles having a predetermined size range, and
c) removing the solvent from the reaction mixture in order to obtain said solid catalyst component particles.

The catalyst component may include, in addition to said transition metal compound, any additional cocatalyst(s), e.g. additional transition metal compounds and/or activators and/or poison scavengers, and/or any reaction product(s) of a transition metal compound(s) and a cocatalyst(s). The solid catalyst may be formed in situ from the catalyst components in said solution without using any external supports or carriers.

Accordingly, the present invention provides a process for the production of a polymer film or fibre comprising a propylene homo- or copolymer wherein said propylene homo- or copolymer is produced in a process which comprises the polymerization of propylene monomers or propylene monomers and one or more types of comonomers in the presence of a high yield Ziegler-Natta olefin polymerization catalyst, which catalyst comprises a component in the form of particles having a predetermined size range which has been produced in a process comprising
a) preparing a solution of a complex of a group 2 metal and an electron donor by reacting a compound of said metal with said electron donor or a precursor thereof in an organic liquid reaction medium,
b) reacting said complex in a solution with a compound of a transition metal to produce an emulsion the dispersed phase of which containing more than 50 mol % of the Group 2 metal in said complex,
c) maintaining the particles of said dispersed phase within the average size range of 5 to 200 microns by agitation in the presence of an emulsion stabilizer and
d) solidifying said particles, and recovering, optionally washing said particles to obtain said catalyst component.

A transition metal is defined as a metal of groups 3 to 10 of the Periodic Table (IUPAC) or an actinide or lanthanide.

The preparation of such catalyst components is described in WO 03/000754 and WO 03/000757. The contents of these documents is included herein by reference. In particular, it is referred to the examples given in each of these documents, where the preparation of such catalyst components is described in detail. The catalyst particles prepared in accordance with these documents have excellent morphology and good, uniform particle size distribution and, due to the replica effect, the polymer particles produced by using these catalysts have very good morphology properties, too.

Preferably, the final catalyst used in the process of the present invention is a catalyst which is not supported on an external carrier.

With the described process, polypropylene can be obtained which is particularly suitable for film and fibre applications. This results from the fact that the obtained product is having an optimal balance between stiffness and XS content, i.e. a decreased stiffness and, at the same time, a low XS value for both homo- and copolymer products.

It is believed that this excellent combination and balance of properties is due to an even distribution of the stereodefects/comonomers in the final propylene polymer chains. It is known that polymerization of propylene using conventional supported high yield Ziegler-Natta catalysts of the prior art leads to highly isotactic products. However, for film and fibre applications, lower isotacticity is desired.

In the final polymers produced according to the invention, the isotactic sequence length distribution determines the lamella thickness which in turn determines the melting temperature, crystallinity, and the stiffness of the polymer. Shorter sequences give thinner lamellas, which in turn leads to lower melting points. The resulting even distribution of short isotactic sequences of the products obtained by the inventive process improves the stretchability of the polymer in the solid state, causes an optimised balance between low amount of xylene solubles as well as a low stiffness, and good processability for film and fibre grades. Relations between polymer chain structure and polymer properties are confirmed and disclosed in more detail in the experimental section below.

The significance of the stereo defects/comonomers distribution and the role of the chain microstructure in polypropylenes is discussed for example in the articles by N. Fujiyama et al., "Crystallization and Melting Characteristics of Metallocene Isotactic Polypropylenes", Journal of Applied Polymer Science, Volume 85, pp. 1851 to 1857 (2002), R. G. Alamo et al., "Crystallization Rates of Matched Fractions of MgCl$_2$-Supported Ziegler-Natta and Metallocene Isotactic Poly(Propylene)s. Part 1", Macromolecules 2003, 36, pp. 1559 to 1571, and J. C. Randall, "Crystallization Rates of Matches Fractions of MgCl$_2$-Supported Ziegler-Natta and Metallocene Isotactic Poly(propylene)s. Part 2", Macromolecules 2003, 36, pp. 1572 to 1584.

Furthermore, the molecular weight distribution of the propylene homo- or copolymer used in the process according to the invention is preferably higher than 3.5, more preferably higher than 4.0, still more preferably higher than 4.5, still more preferably higher than 5.0 and most preferred higher than 6.0.

In the process including the use of the particular Ziegler-Natta catalyst component as described above either propylene homo- or propylene copolymers including one or more types of comonomers can be produced.

Preferably, in case a propylene copolymer is produced, the comonomer(s) is/are selected from the group of alpha-olefins, more preferred from the group of C$_2$-C$_8$ alpha-olefins and still more preferred from the group of C$_2$-C$_4$ alpha-olefins. It is particularly preferred that the comonomer is ethylene.

Further preferred, the described process for polymerising propylene is carried out in a one stage or multistage process which may comprise a series of polymerization reactors of any suitable type producing propylene homo- or copolymer. Polymerisation is carried out in the presence of the above described, preferably unsupported, high yield Ziegler-Natta catalyst, and optionally hydrogen or another molar mass regulator. The process may thus comprise at least one slurry or gas phase reactor or a combination thereof. Preferably, slurry reactors are selected from loop or continuous stirred tank reactors, most preferably the slurry reactor is a bulk-loop reactor.

In one preferred embodiment the reactor system comprises at least one loop and at least one gas phase reactor. However, it is generally possible to use several reactors of each type in any order.

The polymerization temperature is typically between 50 and 110° C., more preferably between 60 to 90° C. and still more preferably between 60 and 80° C.

The pressure in slurry reactors is preferably between 20 to 100 bar, more preferably between 30 to 60 bar, and in gas phase reactors below 40 bar, more preferably between 10 and 40 bar.

In a further preferred embodiment of the process, in the production process of the catalyst component a turbulence minimizing agent is added to the reaction mixture before solidifying said particles of the dispersed phase. This preferred option is described in WO 03/000754 to which it is referred.

Still further, in another embodiment of the process in the production of the catalyst component an aluminium alkyl compound, preferably of the general formula AlR$_{3-n}$X$_n$ wherein R stands for straight chain or branched alkyl group having 1 to 20, preferably 1 to 10 and more preferably 1 to 6 carbon atoms, X stands for halogen and n stands for 0, 1, 2 or 3, is added, and brought in contact with the droplets of the dispersed phase of the agitated emulsion before recovering the solidified particles of the catalyst component.

In this embodiment, it is further preferred that the aluminium compound is added, in pure form or in the form of a solution, from shortly before the beginning of the emulsion formation until adding it to the washing liquid, e.g. toluene, in such an amount that the final Al content of the particles is from 0.05 to 1%, preferably 0.1 to 0.8% and most preferably 0.2 to 0.7% by weight of the final catalyst particles. The most preferred Al content may vary depending on the type of the Al compound and on the adding step. For example, in some cases the most preferred amount may be 0.1 to 0.4 wt.-%.

Still further, preferably tri-(C$_1$-C$_6$)-alkyl aluminium compounds are used, triethylaluminium being most preferred.

Further preferred for all embodiments of the described process, the transition metal in the catalyst component is a Group 4 metal, preferably titanium. In a still further embodiment of the invention a compound of a transition metal can also be selected from Group 5 metals, Group 6 metals, Cu, Fe, Co, Ni and/or Pd.

Preferably, the complex of a Group 2 metal in the process is a halide, most preferably chloride.

Further preferred said Group 2 metal is magnesium.

Further preferred embodiments of the catalyst component production process as part of the process according to the invention include all preferred embodiments as described in documents WO 03/000754 and WO 03/000757.

In the following, particularly preferred embodiments of the catalyst component production process as part of the described process for the production of propylene homo- or copolymer are described.

A preferred embodiment of the process for producing catalysts used in the process comprises: preparing a solution of magnesium complex by reacting an alkoxy magnesium compound and an electron donor or precursor thereof in a C$_6$-C$_{10}$ aromatic liquid reaction medium comprising C$_6$-C$_{10}$ aromatic hydrocarbon or a mixture of C$_6$-C$_{10}$ aromatic hydrocarbon and C$_5$-C$_9$ aliphatic hydrocarbon; reacting said magnesium complex with a compound of at least one fourvalent group 4 metal at a temperature greater than 10° C. and less than 60° C., to produce an emulsion of a denser, TiCl$_4$/toluene-insoluble, oil dispersed phase having group 4 metal/Mg mol ratio 0.1 to 10 in an oil dispersed phase having group 4 metal/Mg mol ratio 10 to 100; maintaining the droplets of said dispersed phase within the size range 5 to 200 μm by agitation in the presence of an emulsion stabilizer while heating the emulsion to solidify said droplets and adding turbulence minimizing agent into the reaction mixture before solidifying said droplets of the dispersed phase, said turbulence minimizing agent being inert and soluble in the reaction mixture under the reaction conditions; and recovering the obtained olefin polymerization catalyst component.

The turbulence minimizing agent (TMA) or mixtures thereof are preferably polymers having linear aliphatic carbon backbone chains, which might be branched with short side chains only in order to serve for uniform flow conditions when stirring. Said TMA is in particular preferably selected from α-olefin polymers having a high molecular weight M$_w$ (as measured by gel permeation chromatography) of about 1 to 40×10$^6$, or mixtures thereof. Especially preferred are polymers of α-olefin monomers with 6 to 20 carbon atoms, and more preferably polyoctene, polynonene, polydecene, polyundecene or polydodecene or mixtures thereof, having the molecular weight and general backbone structure as defined before, and most preferable TMA is polydecene.

As electron donor compound to be reacted with the Group 2 metal compound is preferably an mono- or diester of an aromatic carboxylic acid or diacid, the latter being able to form a chelate-like structured complex. Said aromatic carboxylic acid chloride or diacid dichloride with a C$_2$-C$_{16}$ alkanol/or diol, and is preferable dioctyl phthalate.

The reaction for the preparation of the Group 2 metal complex is preferably carried out at a temperature of 20° to 80° C., and in case that the Group 2 metal is magnesium, the preparation of the magnesium complex is carried out preferably at a temperature of 50° to 70° C.

The electron donor is preferably an aromatic carboxyl acid ester, a particularly favoured ester being dioctyl phthalate. The donor may conveniently be formed in situ by reaction of an aromatic carboxylic acid chloride precursor with a $C_2$-$C_{16}$ alkanol and/or diol. The liquid reaction medium preferably comprises toluene.

The emulsion stabiliser is preferably a surfactant, of which the most preferred class is that based on acrylic polymers.

The finally obtained catalyst component is desirably in the form of particles having an average size range of 5 to 200 µm, preferably 10 to 100, more preferably 20 to 50 µm.

The catalyst used in the process comprises a catalyst component prepared as aforesaid, in association with an alkyl aluminium cocatalyst and external donors, and is used for the polymerization of propylene optionally with other monomers, such as $C_2$ to $C_{10}$-olefins.

The alkoxy magnesium compound group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R_2Mg$, wherein each one of the two Rs is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react with a polyhydric alcohol $R'(OH)_m$, or a mixture thereof with a monohydric alcohol R'OH.

Typical $C_2$ to $C_6$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentaerythritol. The polyhydric alcohol can be selected on the basis of the activity and morphology it gives the catalyst component.

The aromatic reaction medium may also contain a monohydric alcohol, which may be straight- or branched-chain. Typical $C_1$ to $C_{20}$ monohydric alcohols are methanol, ethanol, n-propanol, iso-propanol, n-butanol, iso-butanol, sec.-butanol, tert.-butanol, n-amyl alcohol, iso-amyl alcohol, sec.-amyl alcohol, tert.-amyl alcohol, diethyl carbinol, akt. amyl alcohol, sec.-isoamyl alcohol, tert.-butyl carbinol. Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical >$C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1-octadecanol. The monohydric alcohols may be unsaturated, as long as they do not act as catalyst poisons.

Preferable monohydric alcohols are those of formula R'OH in which R' is a $C_2$-$C_{16}$ alkyl group, most preferably a $C_4$-$C_{12}$ alkyl group, particularly 2-ethyl-1-hexanol.

Preferably, essentially all of the aromatic carboxylic acid ester is a reaction product of a carboxylic acid halide, preferably a dicarboxylic acid dihalide, more preferably an unsaturated α,β-dicarboxylic acid dihalide, most preferably phthalic acid dichloride, with the monohydric alcohol.

The catalyst system for polymerising propylene contains the catalyst, external donors and cocatalyst. As external donors are preferably used silane based donors and as cocatalysts aluminium alkyl compounds.

In Ziegler-Natta catalysts aluminium alkyls are used as cocatalysts, i.e. for activating the catalyst. During activation of polypropylene catalysts, aluminium alkyl does not only reduce and alkylate the active metal, but it has also influence on the donor composition. It is well-known that aluminium alkyls can remove carboxylic acid esters, which are used typically as internal donors. At the same time external donors are fixed on the catalyst. Typically, tri-ethyl aluminium (TEA) is used as cocatalysts and silanes as external donors as is disclosed e.g. in articles Sacci, M. C.; Forlini, F.; Tritto I. And Locatelli P., Macromolecules, 1996, 29, 3341-3345 and Sacci, M. C.; Tritto, I.; Shan, C. and Mendichi, R., Macromolecules, 1991, 24, 6823-6826.

However, in the catalysts used in the present invention, the internal donor, di-(2-ethyl hexyl phthalate) (DOP), can be significantly extracted from the catalyst. The extraction level is dependent on the concentration of the aluminium alkyl. The higher the concentration, the more of the internal donor can be extracted. Further, the addition of the external donor together with aluminium alkyl improves the donor exchange. The longer the reaction time is, the more external donor is bound on the catalyst.

It has also been found that the catalyst surface area (measured by BET method) is well below 20 $m^2/g$, preferably below 10 $m^2/g$ and most preferably below 5 $m^2/g$. The surface area does not change after the treatment with aluminium alkyl and external donors, but remains still below 20 $m^2/g$, preferably below 10 $m^2/g$ and most preferably below 5 $m^2/g$.

Furthermore, the propylene homo- and copolymer products obtained by the above-described process have a lower xylene solubles (XS) content than products obtained by conventional catalysts. This is due to more even distribution of the comonomer, preferably ethylene, in the product wherein the comonomer, preferably ethylene, is not so much concentrated into short polymer chains.

Accordingly, the present invention further provides in a first embodiment a polypropylene composition which comprises a propylene homo- or ethylene copolymer with an amount of xylene solubles XS as expressed in wt.-% which complies with relation (1):

$$XS \leq 0.33\ Et^2 + 0.33\ Et + 1 \qquad (1)$$

wherein Et denotes the amount of ethylene in the polymer in wt.-% and Et is in the range of $0 \leq Et \leq 3.5$, preferably of $1 \leq Et \leq 3.5$.

The propylene homo- or copolymer suitable for the production of films and fibres products as produced by the above-described process preferably has a stiffness expressed as flexural modulus (FM) which is clearly lower than the stiffness of a polymer product with a conventional high yield Ziegler-Natta catalyst. The difference of the FM remains about the same independently of the ethylene content of polymer, being at least 100 MPa up to 200 MPa. FM decreases almost linearly with the amount of ethylene in the polymer.

The present invention therefore provides in a second embodiment a further polypropylene composition comprising a propylene homo- or ethylene copolymer with flexural modulus FM as expressed in MPa which complies with relation (2):

$$FM \leq 1700 - 225Et \quad (2)$$

wherein Et denotes the amount of ethylene in the polymer in wt.-% and Et is in the range of $0 \leq Et \leq 3.5$, preferably of $1 \leq Et \leq 3.5$.

Preferably, the polypropylene composition according to the present invention combines both the features of the above described first and second embodiment.

Further, preferably, the molecular weight distribution of the propylene homo- or copolymer used in the compositions according to the invention is higher than 3.5, more preferably higher than 4.0, still more preferably higher than 4.5, still more preferably higher than 5.0 and most preferred higher than 6.0.

In addition, the melting point (MP) of the compositions of the invention is slightly lower than that of a polymer produced with a conventional high yield Ziegler-Natta catalyst. This is due to shorter sequences in the produced product which give thinner lamellas which, in turn, give a lower melting point.

Thus, further preferred, the propylene homo- or copolymer suitable for the production of films and fibres has a melting point of 165° C. or below.

For propylene homopolymers, it is more preferred that the melting point is in the range of 160 to 165° C. and that the XS content is below 3 wt.-%.

For propylene copolymers, the melting point preferably also always is 165° C. or below. The more preferred value may still be lower depending on the comonomer content, e.g. for a polypropylene with an ethylene content of about 3.5 wt.-% the melting point is preferably in the range of 140 to 145° C., i.e. the higher amount of comonomer the lower the more preferred values for the melting point.

Preferably, the propylene homo- or ethylene copolymer of the compositions according to the invention is produced in a process in which a high yield Ziegler-Natta catalyst comprising a component as described above is used.

The present invention furthermore relates to the use of a polymer composition comprising a propylene homo- or copolymer for the production of a polymer film or fibre, wherein the propylene homo- or copolymer has been produced in a process which comprises the polymerization of propylene monomers or propylene monomers and one or more types of comonomers in the presence of a high yield Ziegler-Natta olefin polymerization catalyst, which catalyst comprises a component as described above.

The invention will now further be illustrated by way of examples with reference to the figures.

EXPERIMENTAL

1. SIST Method

Figure 1:
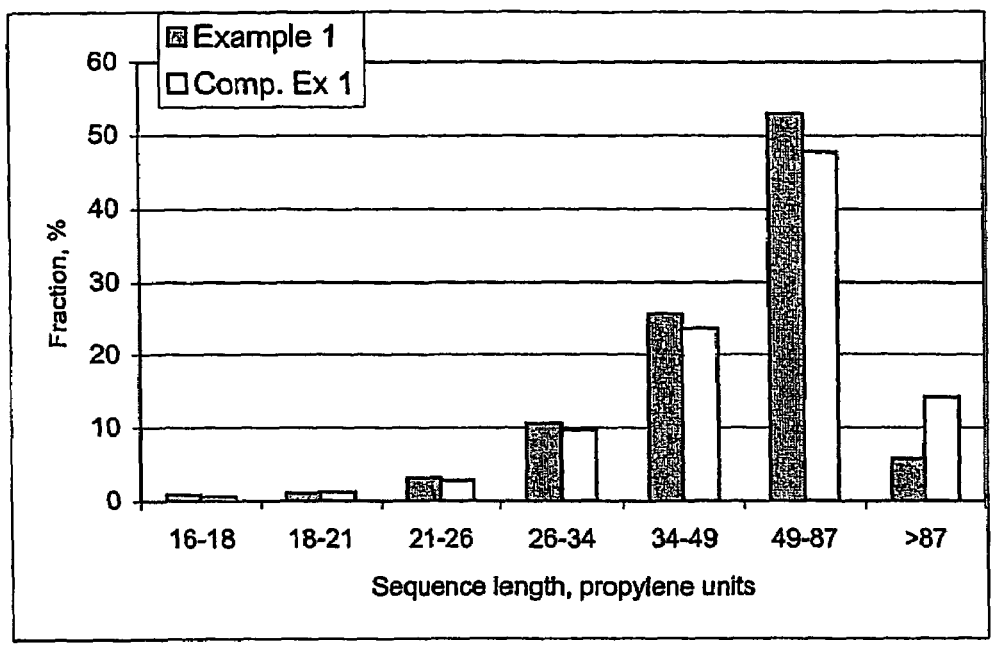
FIG. 1 shows the fraction of molten polymer as a function of the sequence length of the propylene units for the polymers produced according to Example 1 and Comparative Example 1.

SIST (Stepwise Isothermal Segregation Technique) fractionates the material according to chain regularity (the average length of isotactic PP sequences between the defects). The isothermal crystallization at a certain temperature allows the crystallization of lamellae with a dimension large enough to be stable at that temperature. Upon isothermal crystallization at decreasing temperatures it is thus possible to fractionate the polymer in terms of lamella size. At the highest crystallization temperature only the most regular polymer chains are able to crystallize. As the temperature decreases, the critical length decreases.

The distribution of defects, in turn, influences the average length of the crystallisable (fully isotactic) sequences.

The isothermal crystallization for SIST analysis was performed in a Mettler TA820 DSC on 3±0.5 mg samples at decreasing temperatures between 145° C. and 105° C. The samples were melted at 225° C. for 5 min., then cooled at 80° C./min to 145° C. for 2 hours, then cooled to the next crystallization temperature. Each of the 5 temperature ramps took 2 hours and the step was 10° C. After the last step, the sample was cooled down to ambient temperature, and the melting curve was obtained by heating the cooled sample at a heating rate of 10° C./min. up to 200° C. All measurements were performed in a nitrogen atmosphere.

The melting curve of the material crystallized this way can be used for calculating the lamella thickness distribution according to Thomas-Gibbs equation:

$$T_m = T_0\left(1 - \frac{2\sigma}{\Delta H0 \cdot L}\right)$$

Where $T_0 = 457$ K, $\Delta H_0 = 184 \times 106$ J/m$^3$, $\sigma = 0.049.6$ J/m$^2$ and L is the lamella thickness.

The average isotactic sequence length distributions were calculated from lamella thickness using a fibre length of 6.5 Å for 31 helices.

The lower the SIST-measured peak at the highest temperature, the more defects there are in the polymer. To get a quantitative view of the sequence length distribution in the polymer, the melting curve was subdivided in areas with a temperature interval of 10 deg and converted into sequence length distributions.

2. Determination of XS Contents

For the determination of the xylene solubles fraction, 2.0 g of polymer is dissolved in 250 ml p-xylene at 135° C. under agitation. After 30±2 min the solution is allowed to cool for 15 min at ambient temperature and then allowed to settle for 30 min at 25±0.5° C. The solution is filtered with filter paper into two 100 ml flasks.

The solution from the first 100 ml vessel is evaporated in nitrogen flow and the residue is dried under vacuum at 90° C. until constant weight is reached.

The xylene soluble fraction is calculated using the following equation:

$$XS\% = (100 \cdot m_1 \cdot v_0)/(m_0 \cdot v_1)$$

wherein
$m_0$ = initial polymer amount (g),
$m_1$ = weight of residue (g),
$m_0$ = initial volume (ml),
$v_1$ = volume of analysed simple (ml).

3. Measurement of MFR $MFR_2$ of the polymers was measured in g/10 min in accordance with ISO 1133 at a temperature of 230° C. and a load of 2.16 kg.

4. Flexural Modulus

The flexural modulus (FM) was determined according to ISO 178.

5. Thermal Properties

Melting temperature $T_m$, crystallization temperature $T_{cr}$ and degree of crystallinity were measured with Mettler TA820 differential scanning calorimetry (DSC) on 3±0.5 mg samples. Both crystallization and melting curves were obtained during 10° C./min cooling and heating scans between 30 and 225° C. Melting and crystallization temperatures were taken as peaks of endotherms and exotherms. The degree of crystallinity was calculated by comparison with heat of fusion of a perfectly crystalline polypropylene, i.e. 290 J/g.

6. FTIR-Method

Isotacticity is determined from the adsorption peak at ~998 $cm^{-1}$ using as internal reference peak at ~973 $cm^{-1}$. Calibration is done by samples measured $^{13}C$ NMR-spectroscopy.

7. Molecular Weight Distribution

The molecular weight distribution was measured using Gel permeation chromatography (GPC).

EXAMPLES

HomoPP

Example 1

All raw materials were essentially free from water and air and all material additions to the reactor and the different steps were done under inert conditions in nitrogen atmosphere. The water content in propylene was less than 55 ppm.

The polymerization was done in a 5 liter reactor which was heated, vacuumed and purged with nitrogen before taken into use. 381 µl TEA (triethylaluminium from Witco used as received), 64 µl donor D (dicyclo pentyldimethoxysilane from Wacker, dried with molecular sieves) and 30 ml pentane (dried with molecular sieves and purged with nitrogen) were mixed and allowed to react for 5 minutes.

Half of the mixture was added to the reactor and the other half was mixed with 18.8 mg highly active and stereospecific Ziegler-Natta catalyst (ZN catalyst). The ZN catalyst was prepared according to Example 7 of WO 03/000754:

a) Preparation of the soluble Mg-complex: In a 150 l steel reactor 19.4 kg of 2-ethyl hexanol were added at 20° C. 56.0 kg of a 20% BOMAG A ([Mg (Bu)$_{1.5}$(Oct)$_{0.5}$]) solution in toluene were then slowly added to the well stirred alcohol. The temperature of the mixture was then increased to 60° C., and the reactants were allowed to react for 30 min at this temperature. After addition of 5.5 kg of 1,2-phthaloyldichloride, the reaction mixture was stirred at 60° C. for another 30 min to ensure complete reaction. 13.8 kg of 1-chloro butane were then added at 60° C. and stirring at this temperature was continued for 30 min. After cooling to room temperature, a yellow solution was obtained.

b) Preparation of the catalyst component: 100 ml titanium tetrachloride were placed in a 1 l reactor equipped with a mechanical stirrer. Mixing speed was adjusted to 110 rpm. After addition of 50.0 ml n-heptane, 180.0 ml of the Mg-complex was added to the well-stirred reaction mixture at 25° C. within 10 min. After addition, a dark red emulsion was formed. After addition of the Mg-complex, 5 ml of toluene solution containing 15 mg polydecene was added. Then, 10 ml of Viscoplex 1-254 was added. 10 min after addition, the temperature of the reactor was raised to 90° C. and stirring at this temperature was continued for 30 min. After settling and filtering, the solid was washed with 200 ml of toluene at 90° C. for 35 min. Then, the washings were continued with two timed 150 ml heptane á 10 min. Then, the catalyst was taken out from the reactor to a separate drying vessel as a slurry with 100 ml of heptane. Finally, the solid catalyst was dried at 60° C. by purging nitrogen through the catalyst bed.

The catalyst had a Ti content of 2.84 wt. %. After about 10 minutes, the ZN catalyst/TEA/donor D/pentane mixture was added to the reactor. The Al/Ti molar ratio was 250 and the Al/Do molar ratio was 10.

300 mmol hydrogen and 1400 g propylene were added to the reactor. The temperature was increased from room temperature to 80° C. during 20 minutes. The reaction was stopped, after 60 minutes at 80° C., by flushing out unreacted propylene. Finally, the polymer powder was taken out from the reactor and analyzed and tested. The $MFR_2$ of the product was 23. The details and results are seen in Table 1.

Comparative Example 1

This comparative example was carried out in accordance with Example 1, with the exception that the catalyst was a typical catalyst for producing high stiffness polypropylene products. This catalyst was prepared in accordance with Finish patent No. 88047. The catalyst is a transesterified Ziegler-Natta catalyst, having a Ti content of 2.1 wt. % and was supported on spray crystallized $MgCl_2$. The $MFR_2$ of the product was 18. The details and results are shown in Table 1.

Example 2

This example was carried out using the same procedure as Example 1, with the exception that during catalyst preparation after addition of Viscoplex 1-254, a solution of triethylaluminium in toluene was added.

Preparation of the Soluble Mg-Complex

A magnesium complex solution was prepared by adding, with stirring, 55.8 kg of a 20% solution in toluene of BOMAG A to 19.4 kg 2-ethylhexanol in a 150 l steel reactor. During the addition, the reactor contents were maintained below 20°

C. The temperature of the reaction mixture was then raised by 60° C. and held at that level for 30 minutes with stirring, at which time reaction was complete. 5.5 kg 1,2-phthaloyl dichloride was then added and stirring of the reaction mixture at 60° C. was continued for another 30 minutes. After cooling to room temperature, a yellow solution was obtained.

Preparation of the Catalyst Component 19.5 ml titanium tetrachloride were placed in a 300 ml glass reactor equipped with a mechanical stirrer. Mixing speed was adjusted to 170 rpm. After addition of 10.0 ml n-heptane, 1.0 ml of a solution in toluene of 3.0 mg polydecene and 2.0 ml Viscoplex 1-254, 32.0 g of the Mg-complex were added to the stirred reaction mixture over a 10 minute period. During the addition of the Mg-complex, the reactor contents were maintained below 30° C.

2.0 ml of a solution in toluene of the aluminium compound (Al-compound and amount of Table 1) were then added to the reaction mixture at room temperature and stirring was maintained at that temperature for further 15 minutes.

The temperature of the reaction mixture was then slowly raised to 90° C. over a period of 20 minutes and held at that level for 30 minutes with stirring. After settling and syphoning the solids underwent washing with 100 ml toluene at 90° C. for 30 minutes, 60 ml heptane for 20 minutes at 90° C. and 60 ml pentane for 10 minutes at 25° C. Finally, the solids were dried at 60° C. by nitrogen purge, to yield a yellow, air-sensitive powder.

The Ti content in this catalyst was 3.7 wt.%. The MFR$_2$ of the product was 8. The details and results are shown in Table 1.

Comparative Example 2

The comparative example was carried out in accordance with Comparative Example 1, with the exception that a lower hydrogen amount was used. The MFR$_2$ of the product was 5. The details and results are shown in Table 1.

From Table 1 it can be seen that the process of this invention gives roughly the same XS as the comparative process. However, the isotacticity is much lower and the thermal properties are slightly lower for the product obtained in the process according to this invention than for the product obtained in the comparative process. In the product prepared in the process according to the invention, this is seen as lower stiffness.

Figure 2:
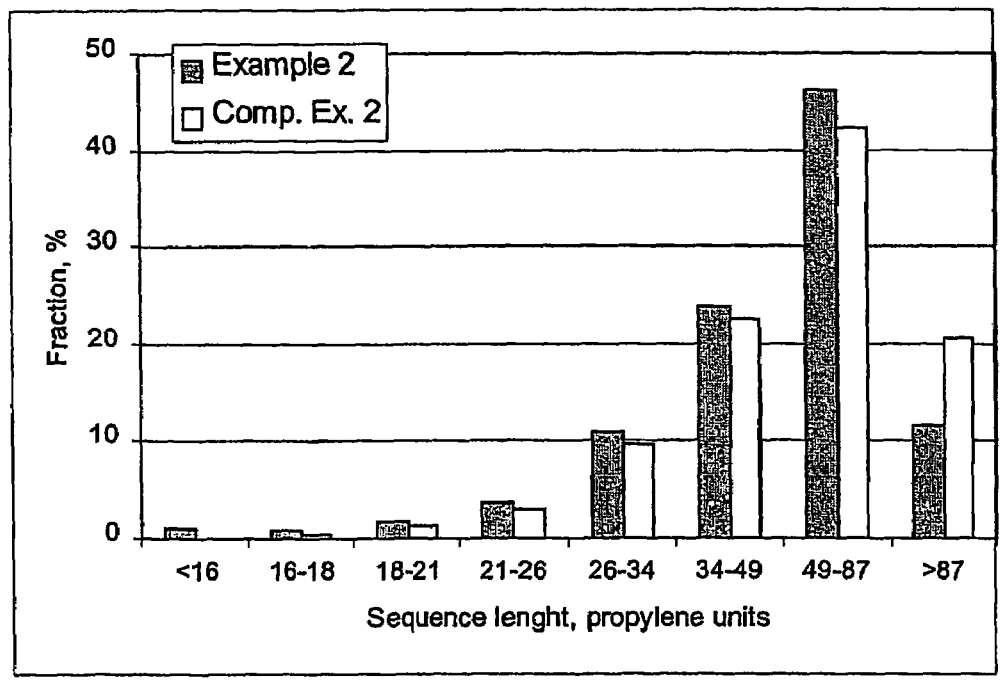
FIG. 2 shows the fraction of molten polymer as a function of the sequence length of the propylene units for the polymers produced according to Example 2 and Comparative Example 2.

As a reason for these results, it is believed that the catalyst used in the process of this invention gives shorter isotactic sequence lengths, i.e. thinner lamellas, than the comparative catalyst. This is clearly seen in Table 2 and FIGS. 1 and 2, where the sequence lengths of the products are disclosed. Accordingly, the catalyst used in the process of this invention gives a smaller fraction of very thick lamellas.

Random PP

Example 3

This example was carried out in accordance with Example 2, with the exception that ethylene was added continuously during the polymerization. The ethylene content in the final polymer was 1.2 wt. %. The details and results are shown in Table 3.

Example 4

This example was carried out in accordance with Example 3, with the exception that more ethylene was added during the polymerization.

The ethylene content in the final polymer was 3.1 wt.%. The details and results are shown in Table 3.

Comparative Example 3

This example was carried out in accordance with Comparative Example 1 with the exception that ethylene was added continuously during the polymerization. The ethylene content in the final polymer was 0.6 wt.%. The details and results are shown in Table 3.

Comparative Example 4

This example was carried out in accordance with Comparative Example 3, with the exception that more ethylene was added during the polymerization. The ethylene content in the final polymer was 1.5 wt.%. The details and results are shown in Table 3.

Comparative Example 5

This example was carried out in accordance with Comparative Example 4, with the exception that more ethylene was added during the polymerization. The ethylene content in the final polymer was 2.9 wt. %. The details and results are shown in Table 3.

Figure 4:
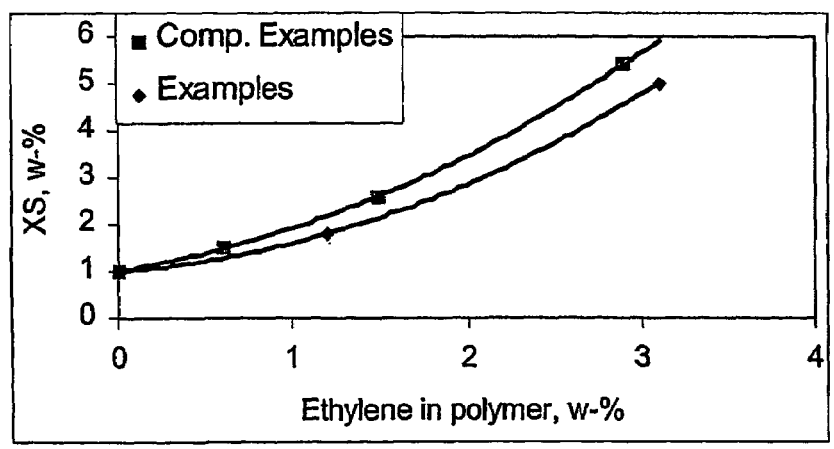
FIG. 4 shows the xylene solubles contents as a function of the ethylene contents for Examples 2, 3 and 4 and Comparative Examples 2, 4 and 5.
Figure 5:
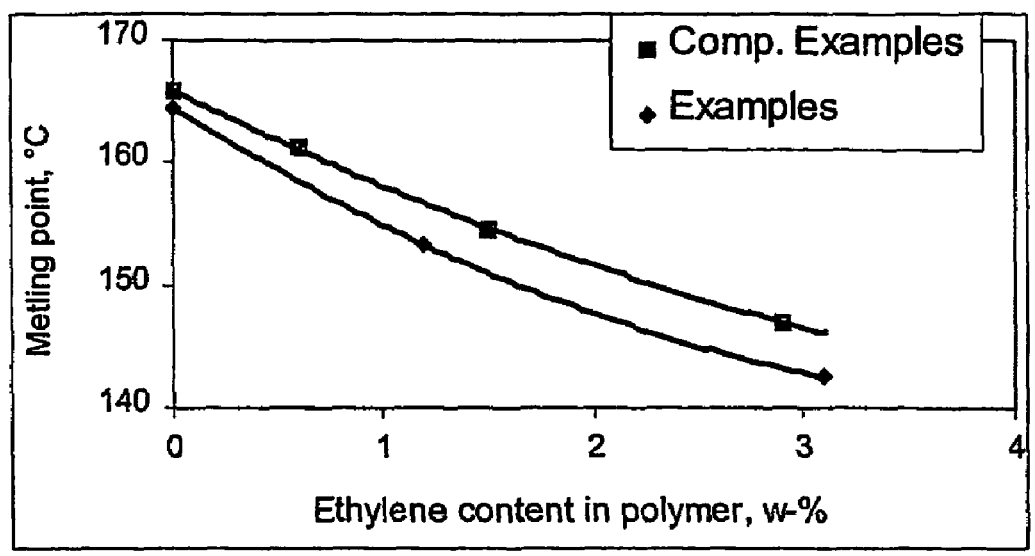
FIG. 5 shows the melting point as a function of the ethylene contents for Examples 2, 3 and 4 and Comparative Examples 2, 4 and 5.
Figure 6:
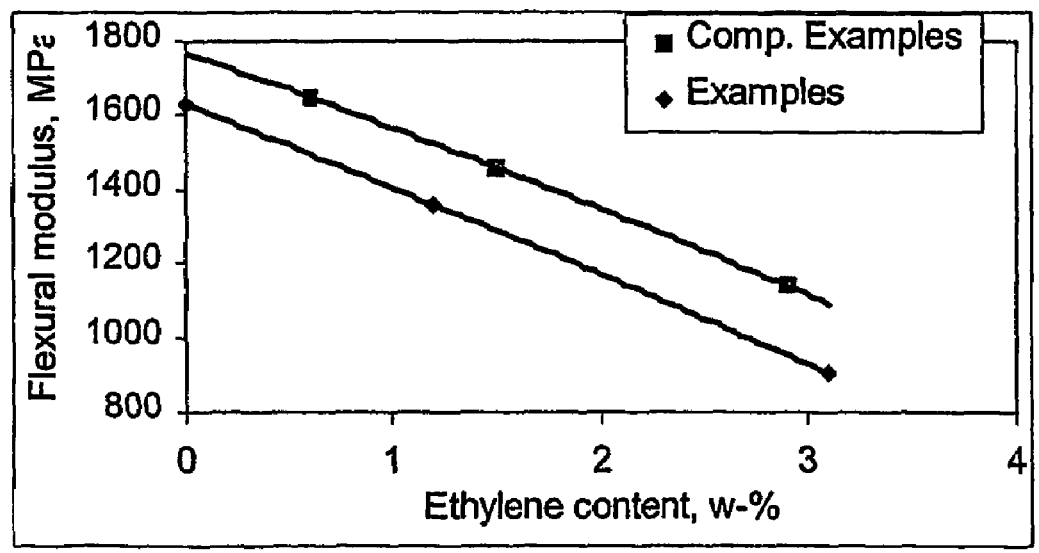
FIG. 6 shows the flexural modulus as a function of the ethylene contents for Examples 2, 3 and 4 and Comparative Examples 2, 4 and 5.

The difference between the products obtained in the process of this invention (Examples 2, 3 and 4) and those obtained in the comparative processes (Comparative Examples 2, 3, 4 and 5) can be best seen in the summarizing FIGS. 4, 5 and 6.

In FIG. 4, it is seen that the catalyst in this invention gives lower XS than the comparative catalyst. This is due to more even distribution of ethylene. Ethylene is not so much concentrated into short polymer chains.

In FIG. 5, it can be seen that the melting point of random PP produced with the catalyst in this invention is lower than with the comparative catalyst. This is due to shorter sequences which give thinner lamellas which give a lower melting point.

Finally, FIG. 6, it can be seen that the short sequence length of the catalyst in this invention via thin lamella thickness gives 100 to 200 MPa lower stiffness.

TABLE 1

Donor D, Al/Do 10 mol/mol, Al/Ti 250 mol/mol, 80° C.

| | | Example 1 | Comp. Ex. 1 | Example 2 | Comp. Ex. 2 |
|---|---|---|---|---|---|
| Time | min. | 60 | 60 | 60 | 30 |
| Hydrogen | mmol | 300 | 480 | 240 | 200 |
| Yield | g | 524 | 700 | 644 | 426 |
| Activity | kg PP/g cat h | 27.9 | 44 | 51.5 | ~40 |
| MFR | g/10 min. | 23 | 18 | 8 | 5 |
| XS | wt. % | 1.3 | 1 | 1 | 1 |
| FTIR Isotacticity | % | 99.4 | 101.5 | 98.6 | 100.4 |
| Tm | ° C. | 163.3 | 164.5 | 164.5 | 165.8 |
| Crystallinity | % | 53 | 54 | 52 | 52 |
| Tcr | ° C. | 118 | 120.8 | 118.1 | 120.6 |
| Flexural Modulus | Mpa | 1640 | 1740 | 1630 | |

TABLE 2

SIST results

| Sequence length Propylene Units | Example 1 Fraction % | Comp. Ex. 1 Fraction % | Example 2 Fraction % | Comp. Ex. 2 Fraction % |
|---|---|---|---|---|
| <16 | | | 1.12 | 0.04 |
| 16-18 | 0.89 | 0.57 | 0.96 | 0.52 |
| 18-21 | 1.14 | 1.25 | 1.8 | 1.3 |
| 21-26 | 3.1 | 2.77 | 3.67 | 2.98 |
| 26-34 | 10.57 | 9.65 | 10.9 | 9.69 |
| 34-49 | 25.6 | 23.57 | 23.83 | 22.63 |
| 49-87 | 52.95 | 47.7 | 46.07 | 42.2 |
| >87 | 5.75 | 14.18 | 11.65 | 20.64 |

TABLE 3

Donor D, Al/Do 10 mol/mol, Al/Ti 250 mol/mol, 80° C., 1 hour bulk

| | | Example 3 | Example 4 | Comp. Ex. 3 | Comp. Ex. 4 | Comp. Ex. 5 |
|---|---|---|---|---|---|---|
| Hydrogen | mmol | 350 | 350 | 440 | 330 | 400 |
| Yield | g | 544 | 556 | 535 | 591 | 624 |
| Activity | kg PP/g cat h | 49 | 46 | 47 | 53 | 68 |
| MFR | g/10 min | 12.6 | 11.1 | 16.1 | 9.7 | 9 |
| XS | wt. % | 1.8 | 5 | 1.5 | 2.6 | 5.4 |
| Ethylene | wt. % | 1.2 | 3.1 | 0.6 | 1.5 | 2.9 |
| Tm | ° C. | 153.3 | 142.5 | 161.2 | 154.6 | 147 |
| Crystallinity | % | 47 | 39 | 50 | 46 | 40 |
| Tcr | ° C. | 114.7 | 104.8 | 117.7 | 111.2 | 106 |
| Flexural Modulus | Mpa | 1360 | 903 | 1650 | 1460 | 1140 |

TABLE 4

SIST Results

| Sequence length Propylene Units | Example 4 Fraction % | Comp. Ex. 5 Fraction % |
|---|---|---|
| <16 | 10.91 | 0.3 |
| 16-18 | 7.75 | 5.22 |
| 18-21 | 13.22 | 10.72 |
| 21-26 | 28.14 | 26.28 |
| 26-34 | 29.45 | 32.68 |
| 34-49 | 10.53 | 24.4 |
| 49-87 | 0 | 0.4 |

Figure 3:
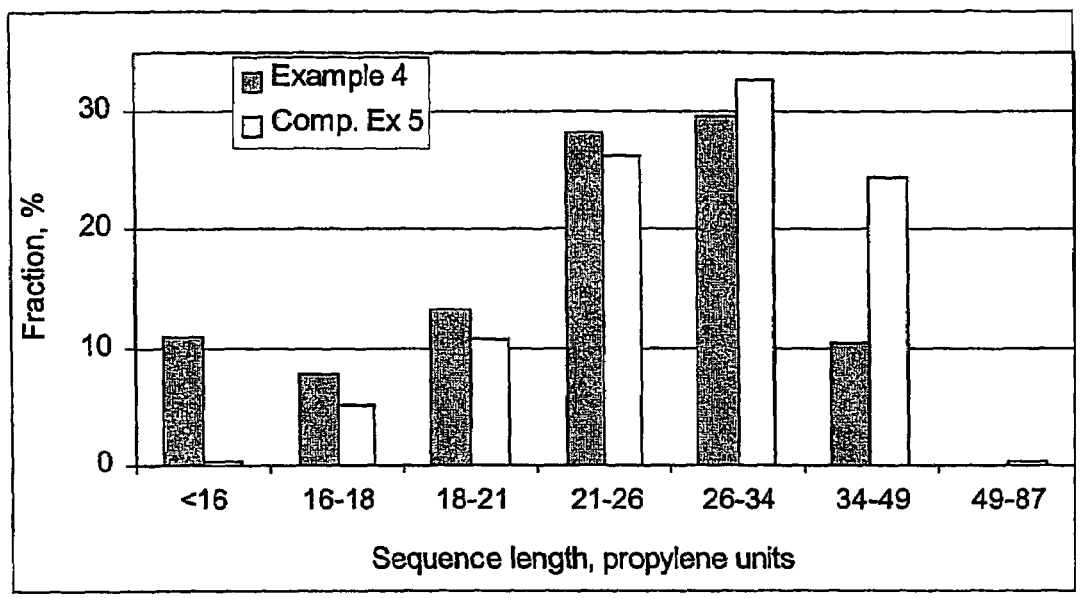
FIG. 3 shows the fraction of molten polymer as a function of the sequence length of the propylene units for the polymers produced according to Example 4 and Comparative Example 5.

It becomes apparent that the catalyst in this invention gives shorter sequences than the comparative catalyst when comparing the results from SIST analyses. In Table 4 and FIG. 3 it is clearly seen that the catalyst in this invention gives thinner lamellas than the comparative catalyst.

NMR Analyses

Example 5

This example was done in accordance with Example 1 with the exception that donor C (cyclohexyl methyl dimethoxy silane) was used as external donor and that temperature was 70° C. The details and results, including NMR analyses are shown in Table 5.

Comparative Example 6

This example was done in accordance with comparative example 1, with the exception that donor C was used as external donor and that the temperature was 70° C. The details and results, including NMR analyses are shown in Table 5.

For someone skilled in the art it is obvious from the NMR results in Table 5 that the products obtained in the process of this invention (Examples 2 and 5) have shorter isotacticity sequences than products obtained in the comparative processes (Examples 2 and 6). The difference is most clearly seen in the amount of mmrr pentads and in the calculated average sequence length. The mmrr pentads describe single stereo defects in the polymer chain, and these are much more frequent in the examples than in the comparative examples.

NMR Methods

The carbon-13 NMR spectroscopy was done with a 400 MHz equipment from Chemmagnetics, CMX 400 Infinity NMR spectrometer, using 5 mm NMR tubes. 80 mg polymer was dissolved in 1,2,4-trichlorobenzene-/deutero-benzene mixture 90:10 by volume. A completely decoupled carbon-13 NMR spectrum with NOE (WALTS decoupling) were run using the following parameters:

| Parameter | Value |
|---|---|
| Temperature | 130° C. |
| Number of scans | 4000-8000 |
| Pulse angle | 45 deg (3.5 μsec) |
| Spectrum width | 7600 Hz |
| Relaxation delay | 7.14 sec |
| Number of points | 16384 |
| Spinning speed | 15 Hz |

The spectra was processed with 2 Hz line broadening, zero filing once and baseline correction.

Calculation of the Results

For the pentad analysis, the assignment is done according to the paper by T. Hayashi et al. (T. Hayashi, Y. Inoue, R. Chüjö, and T. Asakura, "Heptad configurational analysis of $^{13}$C n.m.r. spectra in highly isotactic poly-propylene", Polymer 29, 138-43, (1988)).

The methyl region is deconvulated because of overlapping signals. This procedure gives better accuracy than the normal integration.

Accuracy

For the isotacticity and the mmmm pentad the accuracy of ±1% is obtained.

Average isotactic sequence length (propene units) was calculated from:

mmmm+3*0.5 (rmmm+mmmr)+2*(rmmr)+0.5 (rmrm+mmrr)+0.5 (rmrr+rrmr)/(0.5 (rmrm+mmrr)+0.5 (rmrr+rrmr)+rmrr+0.5 (rmmm+mmmr))

Signals (mrmm+mmrm) and (rmrr+rrmr) overlap. The area used for these is obtained by dividing the area (mmrm+rmrr) by 2.

TABLE 5

| Al/Do 10 mol/mol, Al/Ti 250 mol/mol | | | | | |
|---|---|---|---|---|---|
| | | Example 2 | Comp. Ex. 2 | Example 5 | Comp. Ex. 6 |
| Time | min | 60 | 30 | 60 | 60 |
| Donor | type | D | D | C | C |
| Temperature | °C. | 80 | 80 | 70 | 70 |
| Hydrogen | mmol | 240 | 200 | 70 | 70 |
| Yield | g | 644 | 426 | 412 | 609 |
| Activity | g PP/g cat | 51.5 | ~40 | 19.3 | 21.4 |
| MFR | g/10 min | 8 | 5 | 6.4 | 4.3 |
| XS | wt. % | 1 | 1 | 1.7 | 1.6 |
| FTIR | | | | | |
| Isotacticity | % | 98.6 | 100.4 | 95.1 | 96.7 |
| Tm | °C. | 164.5 | 165.8 | 163 | 164.7 |
| Crystallinity | % | 52 | 52 | 35 | 36 |
| Tcr | °C. | 118.1 | 120.6 | 119 | 119.6 |
| NMR pentads | | | | | |
| mmmm | % | 97.18 | 98.35 | 94.59 | 95.95 |
| mmmr | % | 1.28 | 0.47 | 2.05 | 1.41 |
| rmmr | % | 0 | 0 | 0.13 | 0 |
| isotacticity | % | 98.46 | 98.82 | 96.76 | 97.36 |
| mmrr | % | 0.91 | 0.39 | 1.87 | 1.19 |
| mmrm + rmrr | % | 0.15 | 0.24 | 0.23 | 0.35 |
| rmrm | % | 0 | 0 | 0 | 0 |
| atactic | % | 1.07 | 0.63 | 2.1 | 1.54 |
| rrrr | % | 0.1 | 0.31 | 0.26 | 0.37 |
| rrrm | % | 0 | 0 | 0 | 0.22 |
| mrrm | % | 0.37 | 0.23 | 0.87 | 0.5 |
| syndiotactic | % | 0.47 | 0.54 | 1.13 | 1.09 |
| Average isotactic sequence length | propene units | 182 | 337 | 92 | 132 |

The invention claimed is:

1. A polypropylene composition comprising a propylene copolymer with flexural modulus FM as expressed in MPa which is measured according to ISO 178 and complies with relation (2):

$$FM \leq 1700 - 225 Et \quad (2)$$

wherein Et denotes the amount of ethylene in the polymer in wt.-% and Et is in the range of $0 \leq Et < 3.5$.

2. A polypropylene composition according to claim 1 wherein the amount of xylene solubles XS as expressed in wt.-% complies with the relation (1):

$$XS \leq 0.33 Et^2 + 0.33 Et + 1 \quad (1)$$

wherein Et denotes the amount of ethylene in the polymer in wt.-% and Et is in the range of $0 \leq Et \leq 3.5$.

3. A polypropylene composition according to claim 2 wherein the propylene copolymer is produced by a process which comprises the polymerization of propylene monomers and one or more types of comonomers in the presence of a high yield Ziegler-Natta olefin polymerization catalyst, which catalyst comprises a component in the form of particles having a predetermined size range which has been produced in a process comprising:
    (a) preparing a solution of a complex of a Group 2 metal and an electron donor by reacting a compound of said metal with said electron donor or a precursor thereof in an organic liquid reaction medium,
    (b) reacting said complex in solution with a compound of a transition metal to produce an emulsion the dispersed phase of which containing more than 50 mol % of the Group 2 metal in said complex,
    (c) maintaining the particles of said dispersed phase within the average size range of 5 to 200 microns by agitation in the presence of an emulsion stabilizer and
    (d) solidifying said particles, and recovering, optionally washing said particles to obtain said catalyst component.

4. A Polypropylene composition according to claim 3 wherein the propylene or copolymer has a molecular weight distribution of higher than 3.5.

5. A polymer composition according to claim 1, wherein the propylene copolymer has been produced in a process which comprises the polymerization of propylene monomers and one or more types of comonomers in the presence of a high yield Ziegler-Natta olefin polymerization catalyst, which catalyst comprises a component in the form of particles having a predetermined size range which has been produced in a process comprising:
    (a) preparing a solution of a complex of a Group 2 metal and an electron donor by reacting a compound of said metal with said electron donor or a precursor thereof in an organic liquid reaction medium,
    (b) reacting said complex in solution with a compound of a transition metal to produce an emulsion, the dispersed phase of which contains more than 50 mol % of the Group 2 metal in said complex,
    (c) maintaining the particles of said dispersed phase within the average size range of 5 to 200 microns by agitation in the presence of an emulsion stabilizer and
    (d) solidifying said particles, and recovering, optionally washing said particles to obtain said catalyst component.

* * * * *